United States Patent [19]

Strauss et al.

[11] 3,724,637

[45] Apr. 3, 1973

[54] APPARATUS FOR PICK-UP AND TRANSFER OF CONTAINERS FROM LEHR CONVEYOR TO CROSS CONVEYOR

[75] Inventors: Leo Strauss, East Rockway, N.Y.; Michael J. Sobran, Old Greenwich, Conn.

[73] Assignee: Glass Containers Corporation, Fullerton, Calif.

[22] Filed: May 18, 1971

[21] Appl. No.: 144,439

[52] U.S. Cl....................................................198/21
[51] Int. Cl.............................................H01h 19/00
[58] Field of Search.....198/21, 20, 27, 37; 214/1 BD

[56] References Cited

UNITED STATES PATENTS

| | | |
|---|---|---|
| 2,925,183 | 2/1960 | Eastos................198/27 X |
| 2,623,626 | 12/1952 | Ditolla.................198/27 X |
| 2,948,417 | 8/1960 | Haanes..................214/1 BD |
| 2,496,000 | 1/1950 | Bugenhagen..........214/1 BD X |
| 3,232,446 | 2/1966 | Spurr et al.............214/1 BD |

Primary Examiner—Evon C. Blunk
Assistant Examiner—H. S. Lane
Attorney—Parmelee, Utzler & Welsh

[57] ABSTRACT

An apparatus for effecting transfer of a row of glass containers from a lehr conveyor upon which aligned rows of containers are advancing, to a cross-conveyor disposed above the lehr conveyor. The cross-conveyor is in a plane parallel to the plane of the lehr conveyor. A container engaging and transfer means is movable in an arcuate path from container engaging position above the lehr conveyor to container deposition position above the cross-conveyor.

8 Claims, 7 Drawing Figures

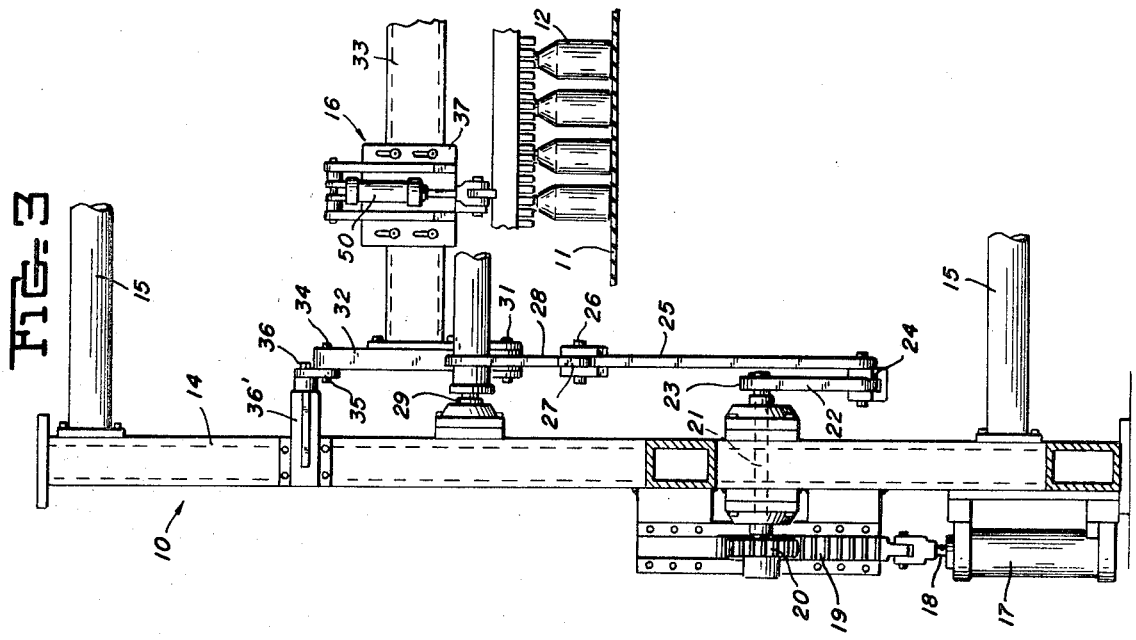
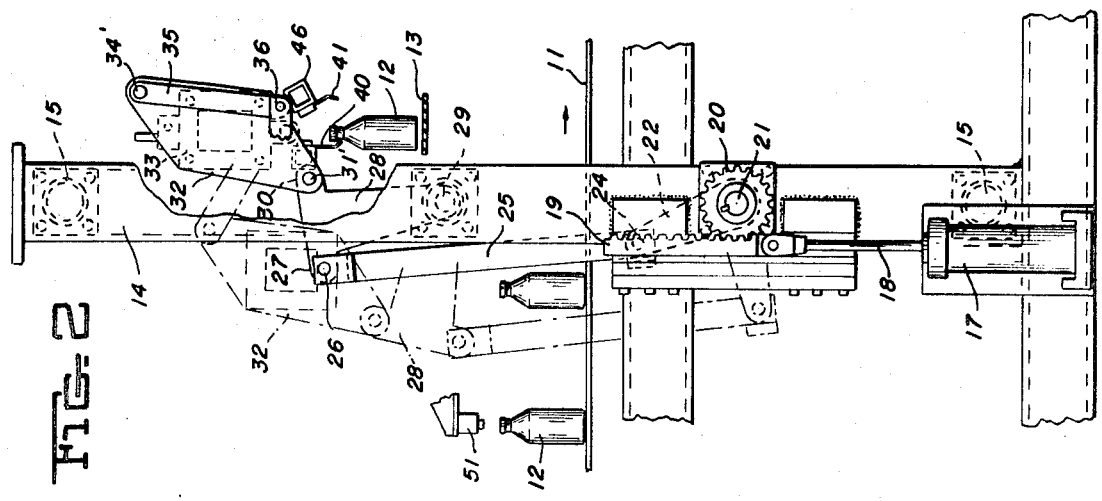
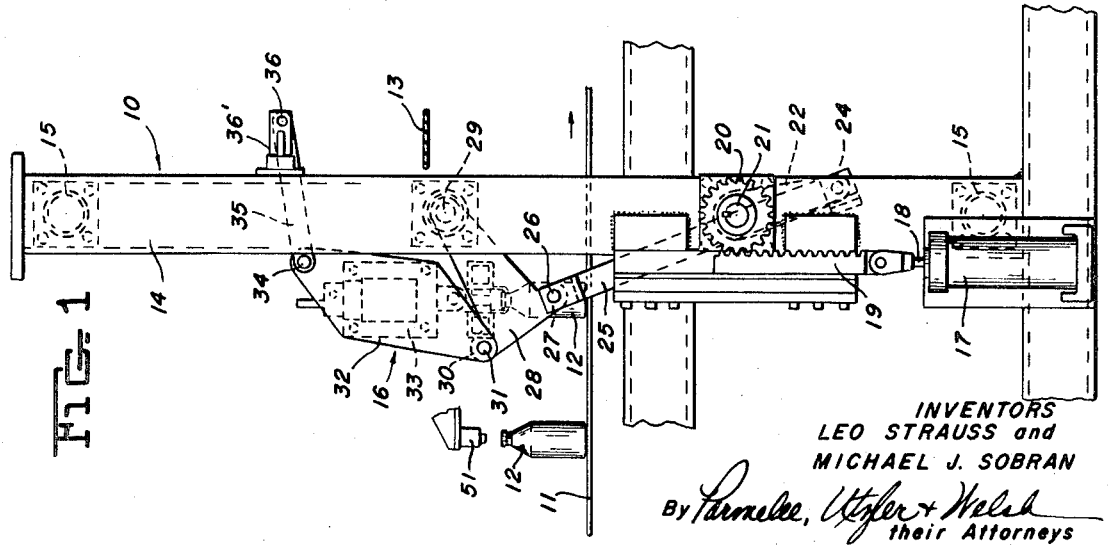
INVENTORS
LEO STRAUSS and
MICHAEL J. SOBRAN
their Attorneys

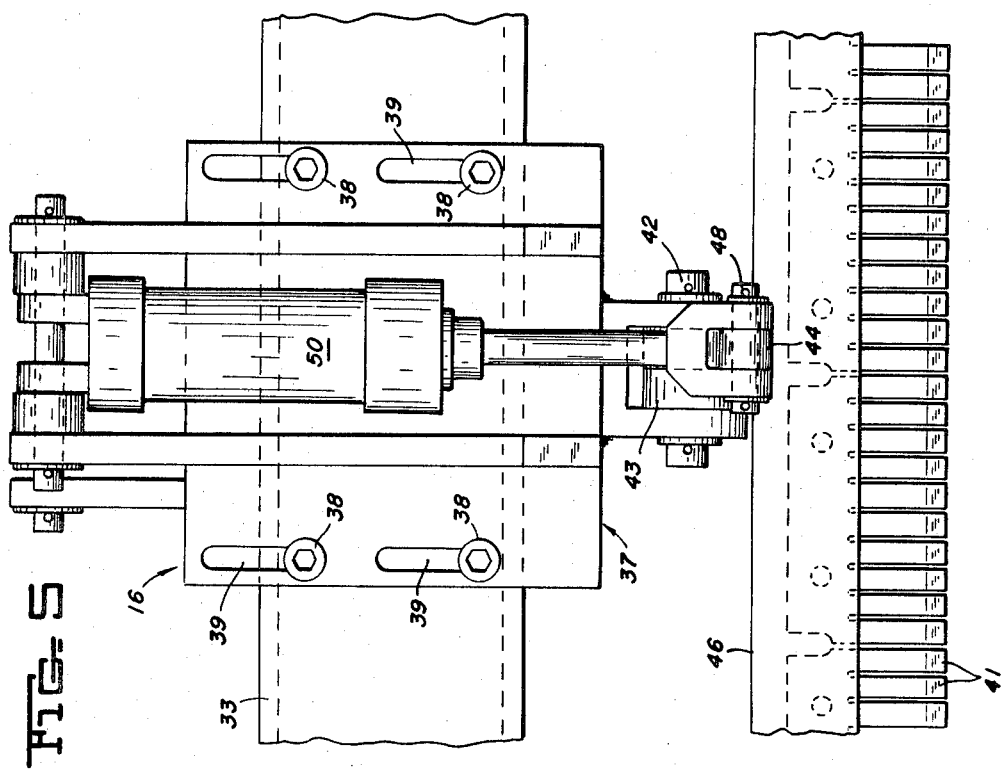
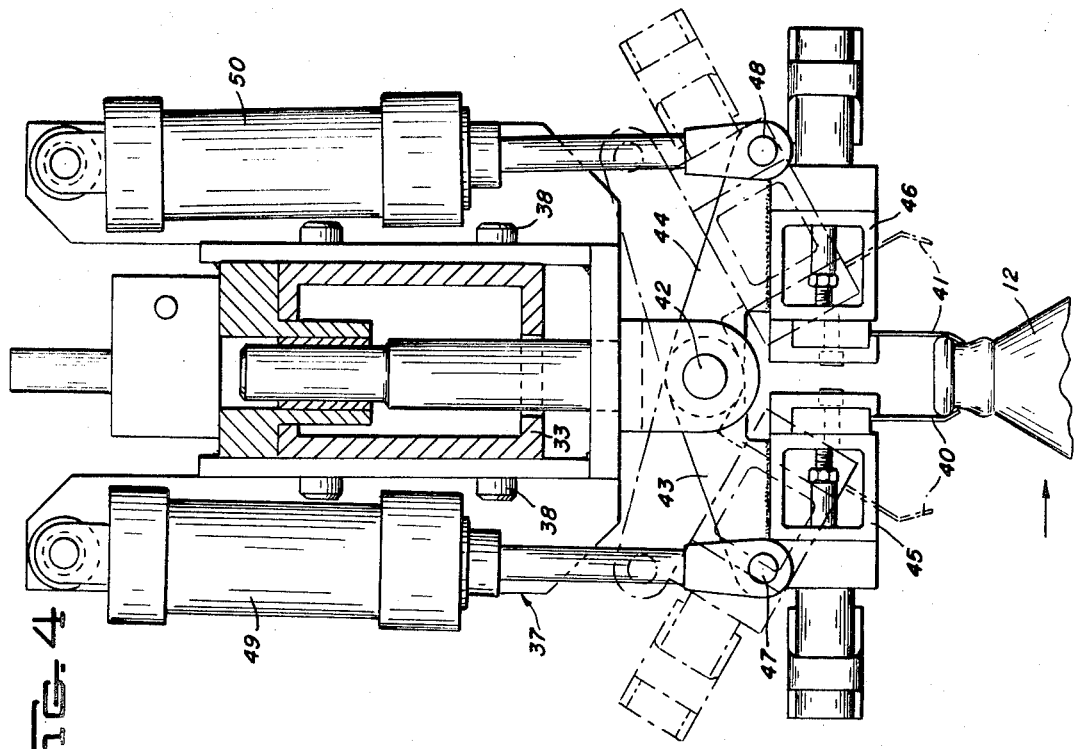

3,724,637

APPARATUS FOR PICK-UP AND TRANSFER OF CONTAINERS FROM LEHR CONVEYOR TO CROSS CONVEYOR

BACKGROUND OF THE INVENTION

In the production and handling of glass containers it is often necessary to transfer such containers from one conveyor to a cross-conveyor. Such a transfer operation must be quickly and reliably performed. Glass containers are formed in a conventional forming machine and discharged onto a transfer conveyor and thereafter aligned and transferred to a lehr conveyor by an apparatus such as described in copending application Ser. No. 820,170 filed Apr. 29, 1969, owned by the assignee of the present invention. The lehr conveyor conducts rows of aligned containers through the lehr or heat treating furnace. It is often desirable to further treat or coat the annealed containers which emerge from the lehr furnace. It is often necessary that the containers be treated singly, which means the containers must be removed from the lehr conveyor and placed on another conveyor, which conducts the containers to the next treating or finishing station. The conveyor to which the containers are to be transferred is often desirably set up as a cross-conveyor to the lehr conveyor. The apparatus used to effect transfer of the aligned rows of lehred containers must rapidly pick-up the relatively hot containers and transfer them to the cross-conveyor without toppling the containers either at the pick-up or delivery position.

In general, apparatus for transferring containers to a cross-conveyor have employed a dead plate between the conveyors with various pusher means for moving the containers across the dead plate to the cross conveyor. Even where there has been a pick-up of the containers to effect such transfer to a cross conveyor, the conveyors have generally been in the same plane with the cross conveyor at the delivery end of the lehr conveyor. In prior art pick-up container transfer devices, a separate means has been used for effecting vertical pick-up and for effecting horizontal movement to the cross-conveyor, which again was in the same horizontal plane as the first conveyor, such as in U.S. Pat. No. 3,184,031.

The glass producer will generally only have a single lehr furnace and conveyor running from the container forming apparatus, and may only wish to specially treat or coat a limited number of the containers coming through the lehr furnace. Thus, the producer wants to be able to transfer a predetermined number of rows of containers coming through the lehr furnace to a cross-conveyor, but then allow the lehr conveyor to continue in normal operation advancing those containers not receiving special treatment. It is therefore important that the cross-conveyor be at another plane so as not to interfere with the containers advancing on the lehr conveyor.

SUMMARY OF THE INVENTION

An apparatus is provided for transferring a linear row of upright containers from a first conveyor upon which the containers are arranged with the row transverse to the direction of first conveyor travel, to a cross-conveyor disposed transversely to the first conveyor and disposed in a parallel plane above the first conveyor. The apparatus comprises a supporting frame extending above and across the first conveyor. A container engaging and transfer device extends from the supporting frame and is adapted to pick-up a row of containers from the first conveyor and deposit same upon the cross-conveyor. Motive means are adapted to the container engaging and transfer device whereby the container engaging and transfer device and the containers are moved in an arcuate path from container engaging position at the first conveyor to container depositing position above the cross-conveyor.

BRIEF DESCRIPTION OF THE DRAWINGS

FIG. 1 is a side-elevational view of the apparatus of the present invention shown in combination with a lehr conveyor and a cross-conveyor, with the apparatus in the container pick-up position;

FIG. 2 is a side-elevation of the same embodiment as in FIG. 1, but with the apparatus in container discharge position;

FIG. 3 is a view of one side of the apparatus taken along the direction of travel of the lehr conveyor, with the apparatus in container pick-up position. A portion of the apparatus extends across the lehr conveyor and is connected to the other side of the apparatus which is identical to the side shown in this figure;

FIG. 4 is an enlarged side view partly in section of the article pick-up portion of the apparatus;

FIG. 5 is a view of the article pick-up portion shown in FIG. 4 taken along the direction of lehr conveyor travel;

DESCRIPTION OF THE PREFERRED EMBODIMENT

APPARATUS DESCRIPTION

Figure 6:
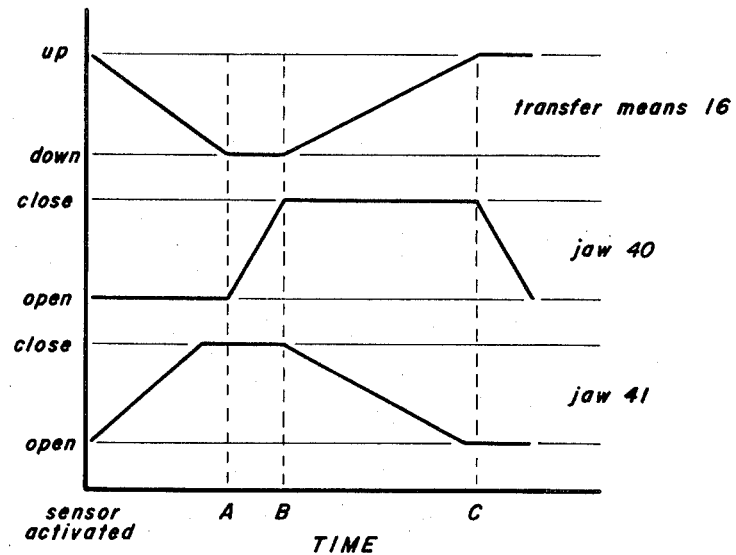
FIG. 6 is a time sequence schematic which illustrates the operation of the apparatus.

The invention can be best described by reference to the exemplary embodiment shown in the drawings. In particular, in reference to FIGS. 1 – 3, the container transfer apparatus 10 is shown in combination with a conventional lehr conveyor 11 upon which are disposed aligned rows of glass containers 12, which are typically bottles. The containers are relatively hot and the rows are preferably spaced a predetermined distance, with the conveyor speed set to allow for transfer of a row of containers before presentation of the next row at the container pick-up position. A cross-conveyor 13 which has a direction of travel transverse to the lehr conveyor 11 direction of travel, is disposed in a plane which is above and parallel to the plane of the lehr conveyor 11. The cross-conveyor 13 is relatively narrow and is particularly adapted to receive a single row of containers and advance same to the next treating, processing station.

The container transfer apparatus 10 comprises vertical side frame members 14 at each side of the lehr conveyor 11. Only one side of the apparatus is shown in FIG. 3, with the other side being identical. Horizontal frame members 15 extend between the side frame members 14 across the lehr conveyor 11, above and below the lehr conveyor. The container transfer apparatus 10 is disposed proximate the end of lehr conveyor 11 or at any point along the conveyor, so that it is then possible for the lehr conveyor 11 to continue unimpeded by the apparatus 10, to advance the containers to the next normal station.

A container engaging and transfer device 16 movably depends from the vertical side frame members 14 above the lehr conveyor 11. The container engaging and transfer device 16 is connected via a mechanical linkage, best seen in FIG. 3, to the vertical side frame members 14.

A fluid motive drive cylinder 17 is affixed to each side frame member 14, with the piston rod 18 extending vertically and connected to rack 19, which drives pinion 20 as the piston rod 18 is reciprocated. Pinion 20 then turns shaft 21, with a link 22 connected to shaft 21 at end 23. The link 22 is pivotally connected at its other end to a further link 25 by means of pivotal connector 24. Further link 25 is pivotally connected at its other end at point 26 to one arm 27 of a rocking plate 28 which itself is pivotally connected at 29 to the side frame 14. The other arm 30 of rocking plate 28 is pivotally connected at point 31 to support plate 32. There is an identical support plate on the other side of the conveyor and frame member 33 extends between the support plates 32. The container engaging and transfer device 16 depends from and is supported by the frame member 33.

The top portion of support plate 32 is pivotally connected at point 34 to link 35, which is in turn pivotally connected at point 36 to arm 36' which is affixed to support frame 14.

The mechanical linkage which governs the travel of transfer means 16 includes what can be termed a parallelogram linkage portion defined by points 29, 31, 34, 36. When transfer means 16 is raised to position above the cross-conveyor as seen in FIG. 2, the points 31 and 34 are translated to 31' and 34', so that the parallelogram is now 29, 31', 34' and 36. It should be observed that the actual motion of the container as a result of this parallelogram linkage is along an arcuate path which is from the lehr conveyor 11 to a point slightly above the cross-conveyor, at which point the containers are dropped onto the cross-conveyor. The return movement of the transfer means is again along an arcuate path back to container pick-up position above the lehr conveyor. This is termed a parallelogram linkage even though there is not actually a mechanical link between points 29 and 36. These points 29 and 36 are fixed and thus their relationship does not change, with an imaginary link between them completing the parallelogram 29, 31, 34, 36.

The container engaging and transfer device 16 is shown in greater detail in FIG. 4 and 5. FIG. 4 is taken transverse to the direction of travel of the lehr conveyor and frame member 33, has container engaging unit 37 adjustably attached thereto via bolts which are slidable in slots 39 provided in unit 37 to allow for vertical adjustment for use with different container heights.

Container engaging unit 37 includes two distinct rows of container engaging jaws 40, 41 which are pivotably hinged to unit 37 at point 42 via pivot links 43, 44. The engaging jaws 40, 41 have support member 45, 46 respectively associated therewith. The support members 45, 46 are pivotally connected at points 47, 48 to respective fluid drive cylinders 49, 50 which are separately operable to effect a swinging down of jaws 40, 41 into container engaging position.

The container engaging jaws 40, 41 are spring steel tines which depend from respective supports 45, 46. The jaw row 40 which is closest to the approaching container rows is termed the hot jaw since it is nearest the hot lehr furnace, and jaw row 41 is termed the cold jaw since it is farther away.

OPERATIONAL DESCRIPTION

Figure 7:
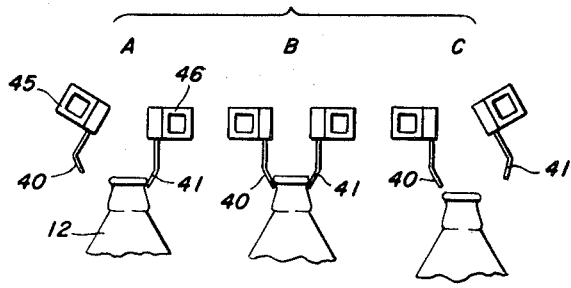
FIG. 7 is a sequential view of the container engaging jaws at various positions which occur during operation of the apparatus.

The operation of the entire apparatus can now be appreciated particularly in conjunction with FIGS. 6 and 7.

A container sensor element 51 is disposed at a predetermined position along the lehr conveyor 11, and is responsive to the presence of a row of containers. The sensor 57 can be a fluidic sensor, photoelectric cell, or other such well known proximity sensor. In the timing sequence of operation shown in FIG. 7 the sensing incident is time zero.

The lehr conveyor 11 has a predetermined travel speed and the time it will take for the row of containers to advance to the container pick-up position is determinable and adjustable by varying the lehr conveyor drive mechanism, not shown.

The sensor signal is transmitted to a conventional timing programer, not shown, which comprises a plurality of time delay relays. These conventional time delay relays provide for transmission of control signals for the fluid motive drive cylinder 17, and the fluid drive cylinders 49, 50.

It takes a predetermined time for the fluid motive drive cylinder 17 to move piston rod 20 up and down. The rod 20 when full down into cylinder 17 brings the container engaging and transfer means 16 down to container engaging position above the lehr conveyor. This is achieved via the mechanical linkage already described.

The fluid drive cylinder 50 is actuated before the article engaging and transfer means 16 reaches the container pick-up position over the lehr conveyor, to swing the cold jaws 41 down into position to contact the containers of the row which is now advanced to pick-up position. The fact that jaws 41 are down in position before the means 16 reaches pick-up position allows jaws 41 to sweep into line any containers which are slightly out of line with the rest of the row.

When means 16 reaches pick-up position on full down travel of the piston 20, the jaws 40 are actuated via cylinder 49, to close down upon the opposite side of the container necks at which time cylinder 17 is simultaneously actuated to move piston 20 upward and thus effect pick-up of the containers from the lehr conveyor 11. The timing sequence of operation of the cylinders 17, 49, 50 which control respectively the lift of pick-up and transfer means 16, and the jaws 40 and 41 is set forth in FIG. 6. The positions of the jaws 40 and 41 at keyed points in the sequence of operations is shown in FIG. 7. The timing sequence starts when the sensor 51 is activated by a row of containers. The timing is effected by using time delay relays to control the cylinders, with the speed of travel of the lehr conveyor known.

In FIG. 6 the movement of transfer means 16 via cylinder 17, of jaws 40, 41 via respective drive cylinders 49, 50, is depicted schematically on the vertical portion of the graph, while time is depicted along the horizontal axis. The designation up and down with respect to the transfer means 16 refers to whether the means 16 is respectively above the cross-conveyor 13 or the lehr conveyor 11. The jaw positions of closed and open refer respectively to the jaw arcing down into container contacting position, or arcing up out of the way of the container so as not to interfere with movement of the container beneath the jaw. The times A, B and C have been picked out in the time sequence shown in FIG. 6 and the jaw positions which correspond to that point in time are seen in FIG. 7.

The timing sequence is such that cold jaw 41 swings down to closed position a short time before the transfer means 16 reaches full down, container engaging position above conveyor 11. Thus, there is no interference with the movement of cold-jaw 41 from any misaligned containers, which might be the case if cold-jaw 41 were closed only when transfer means 16 reached container engaging position. This eliminates the danger of toppling the containers or of damaging the jaw tines which could occur if the jaw were to swing down with a container already underneath and contact the top rim or finish of the container.

The mechanical linkage which allows for travel of the means 16 from above the lehr conveyor to above the cross-conveyor provides greatly simplified operation and eliminates the need for a separate vertical and horizontal drive mechanism and the need for accurately timing the interplay of such vertical and horizontal drive mechanism used in the prior art.

We claim:

1. Apparatus for transferring a linear row of upright containers from a moving first conveyor upon which the containers are arranged with the row transverse to the direction of conveyor travel, to a cross-conveyor disposed transversely to the first conveyor and in a parallel plane above the first conveyor plane comprising:
   a. a supporting frame which extends above and across the first conveyor;
   b. A container engaging and transfer device extending from the supporting frame, adapted to pick up a row of containers from the first conveyor and to deposit the row of containers upon the cross-conveyor; and
   c. means for moving the container engaging and transfer device in an arcuate path from container engaging position above the first conveyor to container deposition position above the cross-conveyor.
   d. a container sensing device which senses a container row at a predetermined position on the conveyor, which sensing means generates a signal used to activate the motive means whereby when the containers arrive at the container pick-up position upon the first conveyor the container engaging means arrives at the same position.

2. The apparatus specified in claim 1, wherein the means for moving the container engaging and transfer device includes a fluid drive cylinder with a piston which is connected to a rack and pinion, which is connected to a mechanical linkage between the support frame and the container engaging and transfer device whereby the containers are moved in the arcuate path.

3. The apparatus specified in claim 1, wherein the means for moving the container engaging and transfer device includes a mechanical parallelogram linkage which effectuates the transfer of said device in an arcuate path from above the first conveyor to a position above the cross-conveyor.

4. The apparatus specified in claim 1, wherein the container engaging and transfer device includes two parallel container engaging jaw rows which are aligned transverse to the first conveyor, with each jaw row being separately swingable movable from a container engaging down position to an up position.

5. The apparatus specified in claim 4, wherein the container engaging jaw row nearest the advancing row of containers is in an up position as the container engaging and transfer device approaches container pick-up position while the other jaw row is in container engaging down position as the container engaging device approaches container pick-up position whereby the other jaw row sweeps misaligned containers into alignment for pick-up.

6. The apparatus specified in claim 4, wherein the jaw row nearest the advancing row of containers is swung down into container engaging position shortly after the container engaging and transfer device reaches the container pick-up position.

7. The apparatus specified in claim 4, wherein the other jaw row is swung to an up position as the container engaging and transfer device arrives at container depositing position above the cross conveyor.

8. The apparatus specified in claim 4, wherein the container engaging jaws comprise spring steel tines.

* * * * *